United States Patent
Kino et al.

(10) Patent No.: US 11,225,431 B2
(45) Date of Patent: Jan. 18, 2022

(54) METHOD OF SINTERING OPTICAL FIBER POROUS GLASS BASE MATERIAL

(71) Applicant: Shin-Etsu Chemical Co., Ltd., Tokyo (JP)

(72) Inventors: Masashi Kino, Ibaraki-ken (JP); Takuya Togashi, Ibaraki-ken (JP); Tetsuya Otosaka, Gunma-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 359 days.

(21) Appl. No.: 16/357,457

(22) Filed: Mar. 19, 2019

(65) Prior Publication Data
US 2019/0292088 A1 Sep. 26, 2019

(30) Foreign Application Priority Data

Mar. 20, 2018 (JP) .................. JP2018-51865

(51) Int. Cl.
*C03B 37/014* (2006.01)
*C03B 37/012* (2006.01)

(52) U.S. Cl.
CPC .... *C03B 37/01282* (2013.01); *C03B 37/0146* (2013.01); *C03B 37/01446* (2013.01)

(58) Field of Classification Search
CPC ........ C03B 37/01282; C03B 37/01853; C03B 37/01446; C03B 37/0146
See application file for complete search history.

(56) References Cited

U.S. PATENT DOCUMENTS

| | | | |
|---|---|---|---|
| 5,106,401 A | * | 4/1992 | Ishikawa ............. C03B 37/0146 65/398 |
| 2004/0060326 A1 | * | 4/2004 | Ishihara ............ C03B 37/01406 65/414 |
| 2005/0147367 A1 | | 7/2005 | Shimada et al. |

(Continued)

FOREIGN PATENT DOCUMENTS

| | | |
|---|---|---|
| DE | 102012112449 A1 | 6/2014 |
| JP | H0312336 A | 1/1991 |
| JP | 3017990 B1 | 3/2000 |

(Continued)

OTHER PUBLICATIONS

Machine Translation of DE 10 2012 112 449 A1 (Year: 2014).*
Annex to European Search Report EP19163180 dated Aug. 12, 2019 (pp. 1-8).

*Primary Examiner* — Cynthia Szewczyk
(74) *Attorney, Agent, or Firm* — Millen, White, Zelano & Branigan, PC; Ryan Pool

(57) ABSTRACT

To provide a method of sintering an optical fiber porous glass base material, capable of sufficient dehydration and reducing a transmission loss caused by residual moisture by efficiently transferring heat from the heater to the base material during a process in dehydration/sintering for an optical fiber porous glass base material, a porous glass base material having a heat shield plate installed in a vicinity of a lower end is vertically inserted into a furnace core tube provided with a heater along an outer circumference, and heating using the heater is performed. The heat shield plate has an outer diameter which is 70% or larger than a diameter of the porous glass base material and smaller than an inner diameter of the furnace core tube.

7 Claims, 5 Drawing Sheets

(56) References Cited

U.S. PATENT DOCUMENTS

2011/0072852 A1\* 3/2011 Krause ................ C03B 19/1453
65/33.1
2014/0097567 A1\* 4/2014 Otosaka ............ C03B 37/02736
269/46

FOREIGN PATENT DOCUMENTS

| JP | 2000219519 A | \* | 8/2000 | ......... C03B 37/0146 |
|----|--------------|---|--------|------------------------|
| JP | 2001287916 A | | 10/2001 | |
| JP | 2012066972 A | | 4/2012 | |

\* cited by examiner

METHOD OF SINTERING OPTICAL FIBER POROUS GLASS BASE MATERIAL

TECHNICAL FIELD

The present invention relates to a method of sintering an optical fiber porous glass base material for manufacturing a glass base material by dehydrating/sintering a porous glass base material.

BACKGROUND ART

A vapor-phase axial deposition (VAD) or an outside-vapor phase deposition (OVD) is known as a manufacturing method of an optical fiber porous glass base material. In such methods, first, a glass raw material is combusted in a flame to generate glass microparticles through hydrolysis. The generated glass microparticles are deposited on a rotating target rod in an axial direction or a radial direction to form a porous glass base material.

The dehydration and the sintering of the porous glass base material are performed using a dehydration/sintering device having a furnace core tube that houses the porous glass base material held by the support rod and a heater arranged around an outer circumference of the furnace core tube. A gas supply nozzle is provided under the furnace core tube, and a gas necessary for dehydrating and sintering the porous glass base material, such as an inert gas or a dehydration gas, is supplied from the gas supply nozzle. Meanwhile, a gas exhaust tube is provided over the furnace core tube to discharge the gas inside the furnace core tube. In addition, the porous glass base material held in the support rod is lowered while being rotated inside the furnace core tube and passes through a heating temperature region of the heater so as to be dehydrated and sintered.

Note that, as a dehydration and sintering method, a two-stage sintering method is generally employed, in which the porous glass base material is dehydrated by passing through the heating temperature region set to have a temperature of 900 to 1300° C. and is then lifted to a predetermined position inside the furnace core tube, the temperature of the heating temperature region is changed to 1400 to 1600° C., and the porous glass base material is sintered by passing through the heating temperature region having the changed temperature again (see Patent Document 1).

In recent years, the size of the optical fiber glass base material increases in order to reduce the manufacturing cost. Meanwhile, in the sintering process of the porous glass base material, it is necessary to sufficiently perform dehydration in order to prevent an increase of a transmission loss of the optical fiber. For this reason, dehydration is performed by passing the porous glass base material through a heater temperature range set to a temperature of 900 to 1300° C., and the dehydrated porous glass base material is then lifted to a predetermined position. Then, sintering is performed by passing the porous glass base material through the heater temperature range set to a temperature of 1400 to 1600° C. again. In this method, the porous glass base material passes through the heater range twice in the dehydration/sintering for converting the porous glass base material to an optical fiber base material. This processing necessitates a long time and degrades productivity.

In this regard, a multistage heater configuration having two or more heaters arranged in a longitudinal direction of the furnace core tube has been proposed, in which dehydration is performed by forming a heating temperature region widened to a temperature of 900 to 1300° C. and heating the base material while housing it in the heating temperature region (see Patent Document 2).

CITATION LIST

Patent Documents

Patent Document 1: Japanese Unexamined Patent Application Publication No. 2010-189251
Patent Document 2: Japanese Unexamined Patent Application Publication No. 2016-088821

SUMMARY OF INVENTION

In the method of Patent Document 2, since the gas flows upward from the lower side of the furnace core tube, the low-temperature region is formed between the heaters positioned in the lower side. Therefore, the base material is not uniformly heated, and dehydration becomes insufficient, so that a transmission loss caused by remaining moisture increases disadvantageously.

In temperature measurement inside the furnace core tube, the low-temperature region formed by the heaters positioned in the lower side has a temperature lower than that of the temperature region formed by the heaters positioned in the center approximately by 50° C.

The present invention provides a method of sintering an optical fiber porous glass base material capable of sufficiently performing dehydration and lowering a transmission loss caused by remaining moisture by efficiently transferring heat from the heater to the base material during a process in the dehydration/sintering processing for the optical fiber porous glass base material.

According to an aspect of the invention, there is provided a method of sintering an optical fiber porous glass base material, including: vertically inserting a porous glass base material having a heat shield plate installed in a vicinity of a lower end into a furnace core tube provided with a heater along an outer circumference; and performing heating using the heater. Preferably, the heat shield plate has an outer diameter which is 70% or larger than a diameter of the porous glass base material and smaller than an inner diameter of the furnace core tube.

Preferably, the method further includes: providing a notch portion in a side portion of a handle in a lower end of the porous glass base material; disposing the heat shield plate over the notch portion while the handle is inserted; fitting a shaft tube having a through-hole in a side portion on the handle; and inserting a pin such that a position of the through-hole of the shaft tube matches a position of the notch portion of the handle to hold the heat shield plate over the shaft tube. Note that, preferably, materials of the heat shield plate, the tube, and the pin are quartz glass, silicon nitride, carbon, or alumina.

A plurality of heaters are installed in an outer circumference of the furnace core tube and are arranged side by side in a vertical direction. In addition, a heating temperature region of 900 to 1300° C. is formed by the heater, and the porous glass base material is dehydrated while vertically moving inside the heating temperature region.

A heating temperature region of 1400 to 1650° C. is formed by the heater, and sintering is performed by moving the dehydrated porous glass base material from a state in which a lower end of the base material is placed in the heating temperature region to a state in which an upper end of the base material is placed in the heating temperature region.

Note that heating may be performed while a heat shield plate is installed also in a vicinity of an upper end of the porous glass base material.

In the sintering method according to the present invention, the heat shield plate is installed in the vicinity of the lower end of the porous glass base material. Therefore, diffusion of the heat of the heater to a region having no base material in the furnace core tube is suppressed, and the heat is efficiently transferred to the base material. Therefore, it is possible to sufficiently perform dehydration. As a result, it is possible to reduce a transmission loss caused by residual moisture.

DESCRIPTION OF EMBODIMENTS

A sintering device has a furnace core tube that houses an optical fiber porous glass base material and a plurality of heaters. A plurality of heaters are installed around the furnace core tube along a longitudinal direction to form a multistage heater region longer than the length of the porous glass base material. The temperature of each heater can be individually controlled.

When dehydration is performed, the temperature of the multistage heater is controlled such that a heating temperature region of 900 to 1300° C. is formed in a region longer than the length of the porous glass base material to heat and dehydrate the entire porous glass base material while housing it in the heating temperature region. Then, when sintering (transparent vitrification) is performed, the temperature of at least one of the heaters included in the multistage heater is controlled while the position of the porous glass base material remains as it is, in order to form a heating temperature region of 1400 to 1650° C. and a length shorter than that of the porous glass base material. As the porous glass base material passes through this heating temperature region, the base material is heated sequentially from one end, so that the entire base material is heated to perform the sintering.

Figure 1:
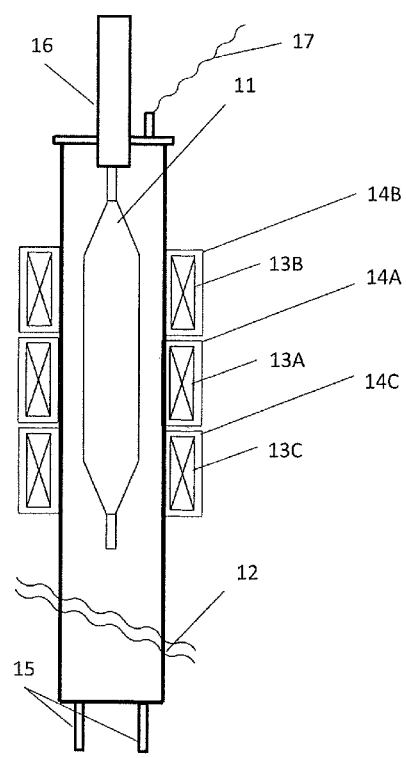
FIG. 1 is a vertical cross-sectional view illustrating a schematic configuration of a sintering device for a porous glass base material.

FIG. 1 is a schematic vertical cross-sectional view illustrating a sintering device for a porous glass base material used in Example.

The sintering device has a cylindrical furnace core tube 12 formed of quartz glass to house a porous base material 11, a multistage heater 13 installed to surround an outer circumference of the furnace core tube 12 along a longitudinal direction, and a furnace body 14 that houses the multistage heater 13. In addition, the sintering device has a gas induction opening 15 for introducing a gas into the inside of the furnace core tube 12, a support rod 16 that supports the base material 11, and a gas exhaust tube 17 for discharging the gas inside the furnace core tube.

The multistage heater 13 has first to third heaters 13A, 13B, and 13C juxtaposed along the longitudinal direction of the furnace core tube 12. The heaters 13A, 13B, and 13C are housed in the furnace bodies 14A, 14B, and 14C, respectively. Note that each heater is installed to independently control the temperature in order of the second heater 13B, the first heater 13A, and the third heater 13C from the upside along the longitudinal direction of the furnace core tube 12 (see FIGS. 4 and 5).

A heating temperature region having a length longer than that of the porous glass base material can be formed by extending the multistage heater 13 in a suitable length. The number of heaters in the multistage heater 13 may increase to reduce the device cost in consideration of an output power of the heater, a capacity of the power supply, and the like.

Figure 2:
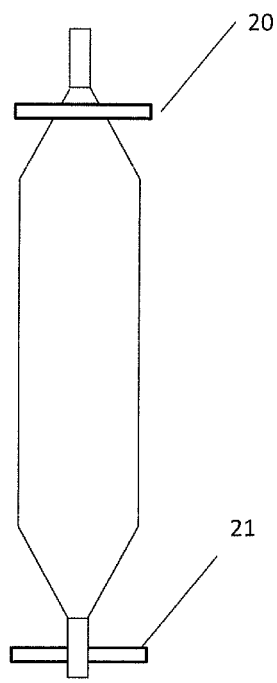
FIG. 2 is a vertical cross-sectional view illustrating an example in which heat shield plates are installed in both ends of the porous glass base material.

FIG. 2 illustrates a porous glass base material having heat shield plates installed in both ends used in Example. The heat shield plate 20 is installed in a vicinity of the upper end of the porous glass base material 11, and the heat shield plate 21 is installed in a vicinity of the lower end of the porous glass base material 11.

Figure 3:
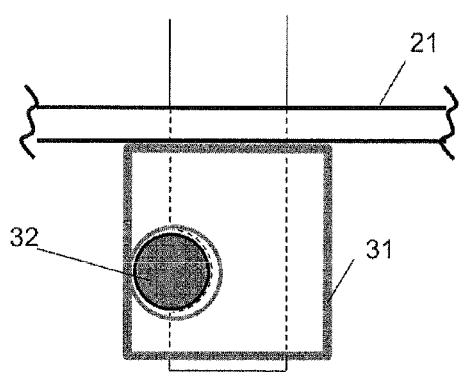
FIG. 3 is a schematic vertical cross-sectional view illustrating an example in which the heat shield plate is installed in a vicinity of a lower end of the base material.

FIG. 3 illustrates a state in which the heat shield plate 21 is installed in the vicinity of the lower end of the porous glass base material.

A semicircular or wedge-shaped notch portion is provided in a side portion of a target rod (handle) in a lower end of the porous glass base material. The heat shield plate 21 is disposed over the notch portion by putting the heat shield plate 21 from the downside of the porous glass base material 11, and a shaft tube 31 having a through-hole in a side portion is then fitted. In addition, a pin 32 is inserted such that a position of the through-hole of the shaft tube 31 matches a position of the notch portion of the target rod. In this configuration, the heat shield plate 21 is held over the shaft tube 31.

Next, a method of sintering the porous glass base material according to the present invention using the sintering device of FIG. 1 will be described.

EXAMPLES (Dehydration Process)

First, the heat shield plate(s) is/are installed in both the upper and lower sides or only in the lower side of the porous glass base material. Then, one end of the porous glass base material is inserted into the inside of the furnace core tube while being held with the support rod, and a top portion of the furnace core tube is covered with a lid. Then, the porous glass base material is set in a predetermined heating position, and each heater of the multistage heater is heated to a predetermined temperature. The temperature of each heater is set such that the porous glass base material can be processed at a predetermined processing temperature. Note that the dehydration processing temperature is set to 900 to 1300° C. In addition, a gas necessary for dehydration, such as a chlorine gas or a gas mixture between a chlorine gas and an inert gas such as helium, argon, or nitrogen, is supplied from the gas induction opening. An internal pressure of the furnace core tube during the dehydration processing is set to be a positive pressure of approximately 10 Pa to 5000 Pa relative to the atmospheric pressure.

The porous glass base material is dehydrated by performing a heating processing for a predetermined period of time while rotating the porous glass base material and vertically moving it as necessary.

Figure 4:
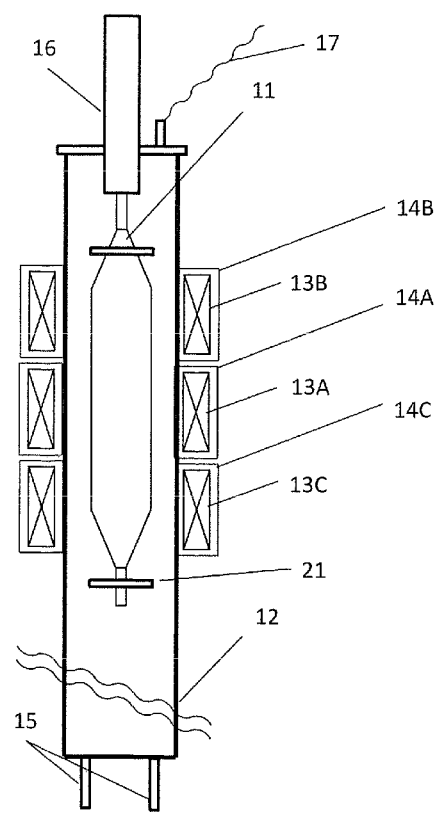
FIG. 4 is a schematic vertical cross-sectional view illustrating a positional relationship between the base material and the heaters when the porous glass base material is sintered using the heat shield plates installed in both ends used in Example.

If a positional relationship is set such that the multistage heater is positioned between the heat shield plates installed in both ends of the base material as illustrated in FIG. 4, the heat radiated from the heater is suppressed to diffuse to a longitudinal direction of the furnace core tube. Therefore, it is possible to efficiently transfer the heat of the heater to the base material.

(Sintering Process)

After completing the dehydration process, the temperature of the first heater 13A increases to a temperature of 1400 to 1650° C. at which sintering is allowed, and the inert gas such as helium or argon is introduced from the gas induction opening. Note that, in the sintering process, the internal pressure of the furnace core tube is set to a positive pressure of approximately 10 to 5000 Pa relative to the atmospheric pressure.

Then, the heating temperature region formed by the first heater 13A is lowered at a predetermined velocity while rotating the porous glass base material with respect to its axis to sinter the porous glass base material sequentially from its lower end. As a result, the porous glass base material is converted into a transparent optical fiber base material.

Here, a length of the heating temperature region of 1400 to 1650° C. using the first heater 13A is preferably set to be shorter than the length of the porous glass base material. In addition, the sintering is preferably performed slowly from one end to the other end of the base material or from the center to one end of the base material for transparent vitrification. By performing the sintering in this manner, a gas relief port is secured at the end of the base material. Therefore, it is possible to obtain a transparent optical fiber glass base material with few bubbles.

The remaining second and third heaters 13B and 13C may have a lower setting temperature for power saving. Alternatively, in order to promote the sintering speed, the remaining second and third heaters 13B and 13C may be controlled to a temperature lower than 1400° C., at which sintering does not occur, to preheat a part of the porous base material not subjected to the sintering.

In the prior art, a sintering furnace of the multistage heater configuration has a low-temperature region formed between the heaters, and a corresponding part of the base material positioned in this low-temperature region is insufficiently heated. Therefore, sufficient dehydration does not occur, and a transmission loss tends to increase due to residual moisture.

According to the present invention, dehydration is processed while the heat shield plate(s) is/are installed at least in the lower side of the base material or in both sides of the base material. Therefore, even when a low-temperature region exists between the heaters in the multiple stage configuration, the heat of the heater is efficiently transmitted to the base material. Therefore, it is possible to sufficiently dehydrate the entire base material.

In the following description, the present invention will be described in more details with reference to examples.

Example 1

An optical fiber base material was manufactured using the sintering device of FIG. 1 by performing dehydration and sintering for the porous glass base material 11 formed by depositing glass microparticles on an outer circumference of a starting core base material (target rod) on the basis of the OVD method.

The multistage heater 13 had a three-stage configuration in which the first heater 13A is arranged in the center, the second heater 13B is arranged over the first heater 13A, and the third heater 13C is arranged under the first heater 13A. The lengths of the first, second, and third heaters were set to 400 mm, 490 mm, and 490 mm, respectively. A gap between the first and second heaters 13A and 13B was set to 645 mm, and a gap between the first and third heaters 13A and 13C was set to 510 mm.

Each heater 13A, 13B, and 13C had a thermometer, so that their temperatures can be independently controlled on the basis of a proportional-integral-differential (PID) control. The heaters 13A, 13B, and 13C are housed in the furnace bodies 14A, 14B, and 14C, respectively, and the furnace bodies 14A and 14B, and 14A and 14C are adjacent with a gap of approximately 200 mm, respectively. A total length of the entire multistage heater (from the upper end of the second heater 13B to the lower end of the third heater 13C) is set to approximately 2500 mm, so that a straight portion of approximately 2000 mm of the base material 11 can be housed in the multistage heater region. It is possible to heat the entire base material to a temperature of 900° C. or higher and heat and dehydrate the entire porous base material at the same time by setting the heaters at suitable temperatures.

A total length of the porous glass base material 11 used for dehydration/sintering was 2800 mm, a length of the straight portion was 2000 mm, and an outer diameter of a silica deposit layer was 330 mm. The inner diameter of the employed furnace core tube 12 was 382 mm.

First, the porous glass base material 11 was vertically lifted, and a heat shield plate 21 (having an inner diameter of 41 mm, an outer diameter of 310 mm, and a thickness of 13 mm) formed of opaque quartz glass was disposed over the semicircular notch portion provided in the side portion of the target rod (handle) in the lower end of the base material. Then, a shaft tube 31 (having an inner diameter of 41 mm and an outer diameter of 62 mm) formed of silicon nitride and having a through-hole (having a hole diameter of 11 mm) in its side portion was fitted. In addition, a pin 32 (having a diameter of 9 mm and a length of 90 mm) was inserted such that a position of the through-hole of the shaft tube 31 matches a position of the notch portion of the target rod to install the heat shield plate 21 in the lower side of the base material.

A heat shield plate 20 (having an inner diameter of 90 mm, an outer diameter of 364 mm, and a thickness of 1.5 mm) formed of carbon was placed in a taper portion of the upper part of the base material 11.

For dehydration of the base material, first, the porous glass base material 11 installed with the heat shield plates 20 and 21 and lowered to the support rod 16 is inserted from an opening of the upper end of the furnace core tube 12, and the lower end of the straight portion of the porous glass base material 11 having an axial direction length of 2800 mm moved to a position facing the heater 13C. In addition, the opening of the upper end of the furnace core tube was covered with a lid (see FIG. 4).

Then, the heating was performed by setting the temperatures of the multistage heaters 13A, 13B, and 13C to 1150° C. The base material 11 was heated across its entire area by vertically moving the base material 11 along the inside of the heating temperature region formed by the multistage heaters. The vertical movement range was set to extend from a position where the upper end of the straight portion of the porous glass base material 11 matches the upper end of the second heater 13B to a position where the lower end of the straight portion of the base material 11 matches the lower end of the third heater 13C.

A dehydration process was performed by vertically moving the base material 11 while rotating it. The rotation speed was set to 5 rpm, and the vertical movement speed was set to 3 mm/min. In this case, a chlorine gas as a dehydration gas was introduced from the gas induction opening 15 at a flow rate of 2 SLM, and the internal pressure of the furnace core tube 12 was maintained at a positive pressure of 10 to 5000 Pa with respect to the atmospheric pressure.

An OH group existing in the porous glass reacts with the chlorine gas and enters into the atmospheric gas. The gas obtained by removing the OH group inside the base material is discharged from the exhaust tube 17 to the outside of the furnace core tube. This process was continuously performed for sixteen hours.

After the dehydration process, helium was introduced from the gas induction opening 15 at a flow rate of 15 SLM for thirty minutes, and the helium was substituted with the chlorine gas inside the furnace core tube. The heating of the heaters 13B and 13C stopped, and the setting temperature of the heater 13A was raised to 1525° C. Helium was introduced at a flow rate of 2 SLM, and the internal pressure of the furnace core tube 12 was maintained at a positive pressure of 10 to 5000 Pa with respect to the atmospheric pressure. Transparent vitrification was performed from the lower end to the upper end of the base material by lowering the base material at a vertical movement speed of 1.5 mm/min while rotating the base material at a rotation speed of 5 rpm, so that an optical fiber preform 18A was obtained.

Figure 6:
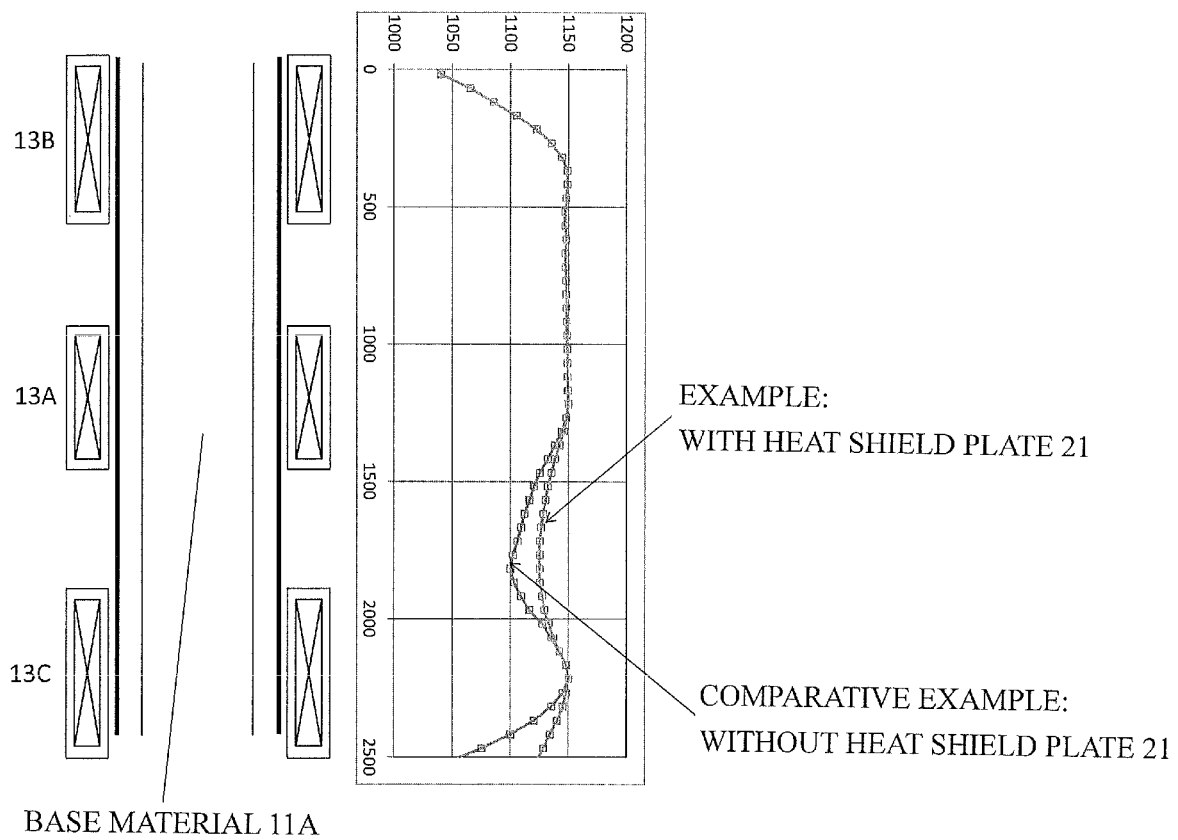
FIG. 6 is a diagram illustrating temperature distributions inside the furnace core tube along a longitudinal direction of the porous glass base material obtained in Example and Comparative Example.

FIG. 6 illustrates a temperature distribution along a longitudinal direction of the porous glass base material 11A inside the furnace core tube while the heat shield plates 21 are installed. Referring to FIG. 6, in the graph illustrated in the right side of the furnace core tube 12, the ordinate refers to the length, and the abscissa refers to the temperature.

Compared with the following comparative example in which no heat shield plate 21 is installed, it is recognized that a temperature drop in a region between the first heater 13A placed in the center and the third heater 13C placed under the first heater 13A is suppressed.

An optical fiber was manufactured by installing a preform obtained by performing dehydration, sintering, and transparent vitrification for the porous glass base material in an optical fiber line drawing device known in the art. Then, a transmission loss was measured, and an optical fiber having a low loss was obtained.

Comparative Example 1

Figure 5:
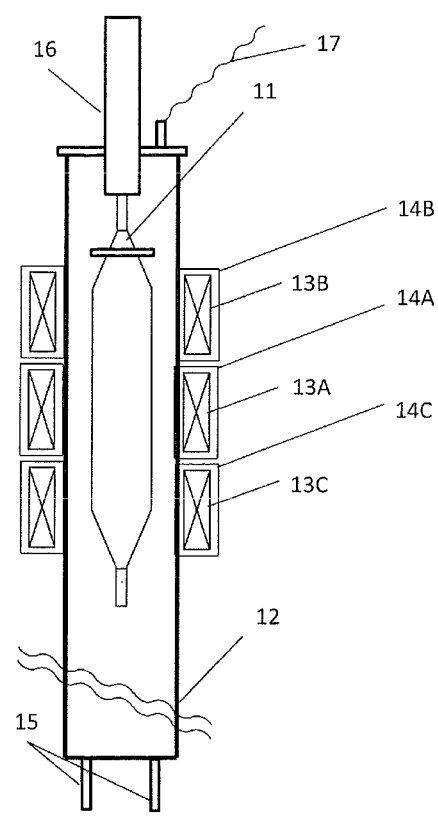
FIG. 5 is a schematic vertical cross-sectional view illustrating a sintered state of the porous glass base material having the heat shield plates installed only in the upper end side in Comparative Example.

Dehydration and sintering were performed while the heat shield plate 20 is installed only in the upper side of the base material without installing the heat shield plate 21 in the lower side of the base material using the sintering device of FIG. 5.

First, the porous glass base material 11 was vertically lifted, and the heat shield plate 20 (having an inner diameter of 90 mm, an outer diameter of 364 mm, and a thickness of 1.5 mm) formed of carbon was placed in the taper portion of the upper side of the base material. Then, the porous glass base material 11 lowered to the support rod 16 was inserted from the opening of the upper end of the furnace core tube 12, and the opening of the upper end of the furnace core tube was covered with the lid. Then, similar to Example, dehydration and sintering were performed for the base material 11 so as to manufacture an optical fiber preform.

FIG. 6 illustrates a temperature distribution along the longitudinal direction of the porous glass base material 11A obtained by performing dehydration and sintering without installing the heat shield plate 21.

Compared to Example in which the heat shield plate 21 is provided, it is recognized that a significant temperature decrease is generated in a region between the first heater 13A placed in the center and the third heater 13C placed under the first heater 13A.

REFERENCE SIGNS LIST 11, 11A porous base material,
12 furnace core tube,
13 multistage heater,
13A, 13B, 13C individual heater,
14 furnace body,
14A, 14B, 14C individual furnace body,
15 gas induction opening,
16 support rod,
17 gas exhaust tube,
20 heat shield plate,
21 heat shield plate,
31 shaft tube,
32 pin

The invention claimed is:

1. A method of sintering an optical fiber porous glass base material, comprising:
   vertically inserting a porous glass base material into a furnace core tube provided with a heater along an outer circumference
   wherein said porous glass base material comprises a heat shield plate positioned over a notch portion provided in a side portion of a handle; and
   wherein a shaft tube having a through-hole positioned directly adjacent to the handle and oriented to match the position of the notch portion,
   wherein a pin is positioned in the through-hole and holds the heat shield plate over the shaft tube,
   performing heating using the heater.

2. The method according to claim 1, wherein the heat shield plate has an outer diameter which is 70% or larger than a diameter of the porous glass base material and smaller than an inner diameter of the furnace core tube.

3. The method according to claim 1, wherein materials of the heat shield plate, the furnace core tube, and the pin are quartz glass, silicon nitride, carbon, or alumina.

4. The method according to claim 1, wherein a plurality of heaters are installed in an outer circumference of the furnace core tube and are arranged side by side in a vertical direction.

5. The method according to claim 1, wherein a heating temperature region of 900 to 1300° C. is formed by the heater, and
   the porous glass base material is dehydrated while vertically moving inside the heating temperature region.

6. The method according to claim 5, wherein a heating temperature region of 1400 to 1650° C. is formed by the heater, and
   sintering is performed by moving the dehydrated porous glass base material from a state in which a lower end of the base material is placed in the heating temperature region to a state in which an upper end of the base material is placed in the heating temperature region.

7. The method according to claim 1, wherein heating is performed while a heat shield plate is installed also in a vicinity of an upper end of the porous glass base material.

* * * * *